United States Patent [19]
Gale, Jr.

[11] Patent Number: 5,285,196
[45] Date of Patent: Feb. 8, 1994

[54] BISTABLE DMD ADDRESSING METHOD

[75] Inventor: Richard O. Gale, Jr., Richardson, Tex.

[73] Assignee: Texas Instruments Incorporated, Dallas, Tex.

[21] Appl. No.: 961,997

[22] Filed: Oct. 15, 1992

[51] Int. Cl.$^5$ .............................................. G09G 3/34
[52] U.S. Cl. ................................................... 345/108
[58] Field of Search ................ 340/764, 783, 805; 358/62, 223; 359/230, 290, 291, 292, 295

[56] References Cited

U.S. PATENT DOCUMENTS 5,083,857  1/1992  Hornbeck .......................... 359/291
5,096,279  3/1992  Hornbeck et al. .................. 359/230

OTHER PUBLICATIONS

Hornbeck, Larry J., *128×128 Deformable Mirror Device*, IEEE Transactions on Electron Devices, vol. ED-30, No. 5, May 1983, pp. 539–545.

*Primary Examiner*—Edward K. Look
*Assistant Examiner*—F. Daniel Lopez
*Attorney, Agent, or Firm*—Brian C. McCormack; James C. Kesterson; Richard L. Donaldson

[57] ABSTRACT

A preferred embodiment of the present invention provides a method of addressing a digital micromirror device (DMD) having an array of electromechanical pixels (20) comprising deflectable beams (30) wherein each of the pixels (20) assume one of two or more selected stable states according to a set of selective address voltages. A first step of the preferred method is electromechanically latching, by applying a bias voltage with an AC and a DC component to the array of pixels (20), each of the pixels (20) in one of the selected stable states. A second step is applying a new set of selective address voltages to all the pixels (20) in the array. A third step is electromechanically unlatching, by removing the bias voltage from the array, the pixels (20) from their previously addressed state. A fourth step is allowing the array of pixels (20) to assume a new state in accordance with the new set of selective address voltages. A fifth step is electromechanically latching, by reestablishing the bias voltage with the AC component and the DC component, each of the pixels (20). Other devices, systems and methods are also disclosed.

18 Claims, 8 Drawing Sheets

BISTABLE DMD ADDRESSING METHOD

CROSS-REFERENCE TO RELATED PATENTS

The following coassigned patent applications are hereby incorporated herein by reference:

| Pat. No. | Filing Date |
|---|---|
| 5,096,279 | Nov. 26, 1990 |
| 5,083,857 | Jun. 29, 1990 |

FIELD OF THE INVENTION

This invention relates to digital micro-mirror devices (DMD's), also known as deformable mirror devices, and more particularly to an addressing arrangement for such devices.

BACKGROUND OF THE INVENTION

DMD's have found numerous applications in the areas of optical information processing, projection displays, and electrostatic printing. See references cited in L. Hornbeck, 128×128 Deformable Mirror Device, 30 IEEE Tran. Elec. Dev. 539 (1983).

A great number of the applications described in Hornbeck, supra, use DMD's operated in a bistable mode as described in U.S. Pat. No. 5,096,279, incorporated by reference herein. The details of '279 will be summarized in some detail herein, but briefly in the bistable mode of a DMD a deflectable beam or mirror may be deflected to one of two landing angles, $\pm\theta_L$, by underlying electrodes to which an address voltage is applied. At either landing angle ($\pm\theta_L$) an extremity of the deflectable mirror lies in contact with an underlying device substrate.

With further reference to '279, in order to lower the address voltage requirement, a bias voltage is applied to the mirror relative to the address electrodes. The bias voltage serves to create energy potential minima. The amount of bias determines whether the deflectable mirror and its associated address and bias circuitry operated in a monostable, tristable, or bistable mode corresponding respectively to one, three, or two energy potential minima. The required address voltage also varies with the amount of bias, and typically the bias voltage is chosen such that the address voltages may operate with 5 V CMOS limits. For example, a typical bistable DMD operated with no bias requires a 16 volt address. At a bias of −10 V the DMD is operating in the tristable mode and requires a +10 V address. At a bias of −16 V the DMD is operating in the bistable mode and requires only a +5 V address. It is clear in this example, that to be compatible with standard 5 V CMOS address circuitry, it is necessary to operate in the bistable mode, which requires bidirectional operation and addressing. When the bias voltage is applied to the deflectable mirror, further changes in the address electrodes within normal operating limits cause no change in state of the deflectable mirror because the address voltage is not sufficient to overcome the potential energy barrier between the stable state in which the mirror resides and the other stable state which exists in a bistable mode. In order to change stable states it is necessary to remove the bias voltage to allow the deflectable mirror to respond to the voltage of the address electrode.

It has been discovered with prior art DMD's that when a deflectable mirror is deflected and in contact with the landing pads on the DMD substrate, it is necessary to apply a high voltage, high frequency resonant reset sequence to allow the mirror's addressed state to change. The reset sequence was adopted to overcome sticking difficulties caused by Van der Waal's forces or surface contamination. These sticking difficulties cause the beam to resist changing states regardless of the condition of the address electrodes underneath the beam.

SUMMARY OF THE INVENTION

The present invention recognizes that the longer the mirror and the landing electrode are in contact in an uninterrupted fashion, the higher the reset voltage must be to release the pixel. The amount of time the mirror and the landing electrode are in contact in an uninterrupted fashion shall be referred to as the residence time. Typical reset voltages are in the range of 12-25 V for residence times ranging from milliseconds to seconds. The present invention seeks to minimize the residence time thereby reducing the required reset voltages or eliminating the high voltage, high frequency, resonant reset altogether.

As such, a preferred embodiment of the present invention superimposes an AC signal onto the normal DC bias signal described above. In this manner it is possible to tilt the mirror to its full deflection ($\pm\theta_L$) without having prolonged, uninterrupted contact with the underlying DMD substrate. By defining the AC signal to have a relatively small amplitude, the optical performance of the micromirror is unaffected, as the small superimposed mirror deflections are insignificant with respect to the addressed deflection to the mirror landing angle ($\pm\theta_L$). Still, the AC signal may be defined to have a large enough amplitude to periodically interrupt contact between the mirror and the DMD substrate preventing formation of chemical bonds and condensation of moisture which can cause the sticking between the mirror and the DMD substrate.

The preferred embodiment provides a method of addressing a digital micromirror device (DMD) having an array of electromechanical pixels comprising deflectable beams wherein each of the pixels assume one of two or more selected stable states according to a set of selective address voltages. A first step of the preferred method is electromechanically latching, by applying a bias voltage with an AC and DC component to the array of pixels, each of the pixels in one of the selected stable states. A second step is applying a new set of selective address voltages to all the pixels in the array. A third step is electromechanically unlatching, by removing the bias voltage from the array, the pixels from their previously addressed state. A fourth step is allowing the array of pixels to assume a new state in accordance with the new set of selective address voltages. A fifth step is electromechanically latching, by reestablishing the bias voltage with the AC component and the DC component, each of the pixels.

The elimination of the high voltage, high frequency resonant reset circuitry and associated switching devices represents a considerable system simplification and cost reduction without degradation in performance. Indeed performance should be slightly improved, as the time taken for application of the reset sequence would be eliminated and can be applied to displaying data.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures refer to corresponding parts unless otherwise indicated.

DETAILED DESCRIPTION OF PREFERRED EMBODIMENTS

Figure 1A:
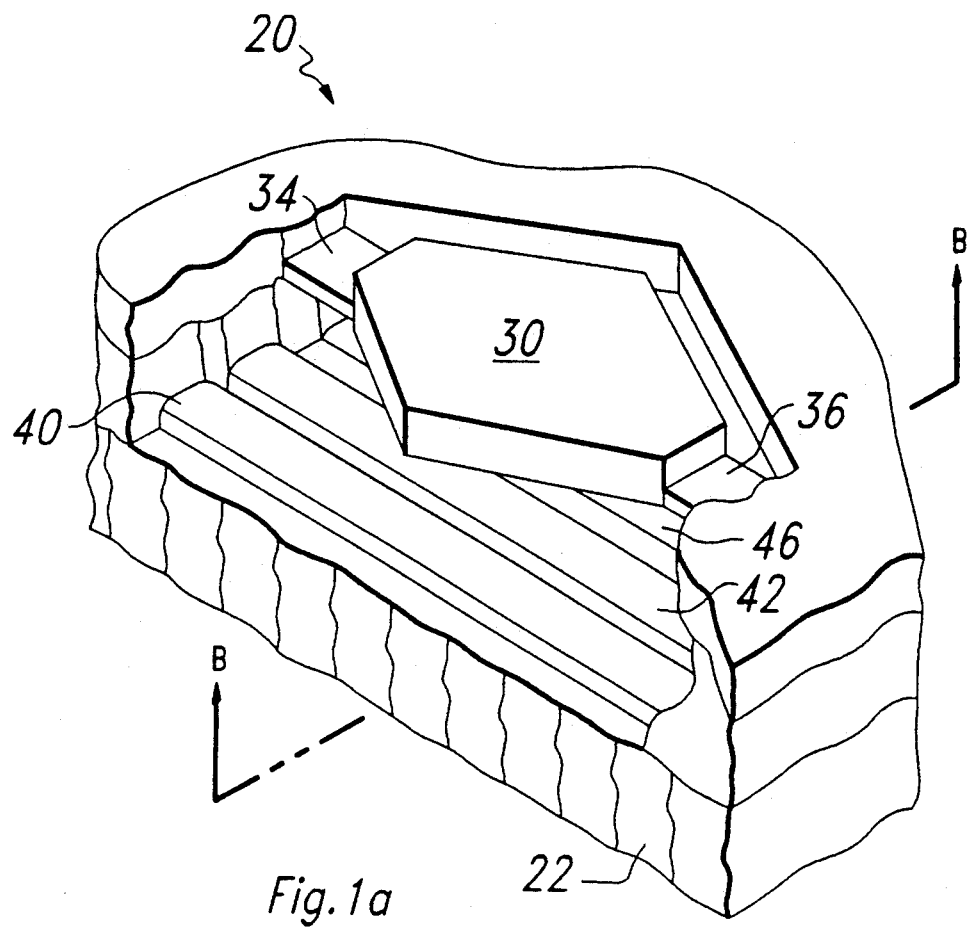
FIGS. 1a-c illustrate in perspective, cross sectional elevation, and plan views, a functional rendering of a preferred embodiment pixel.
Figure 1B:
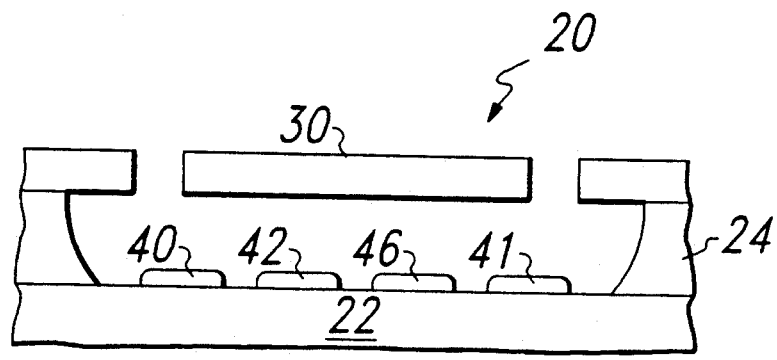
Figure 1C:
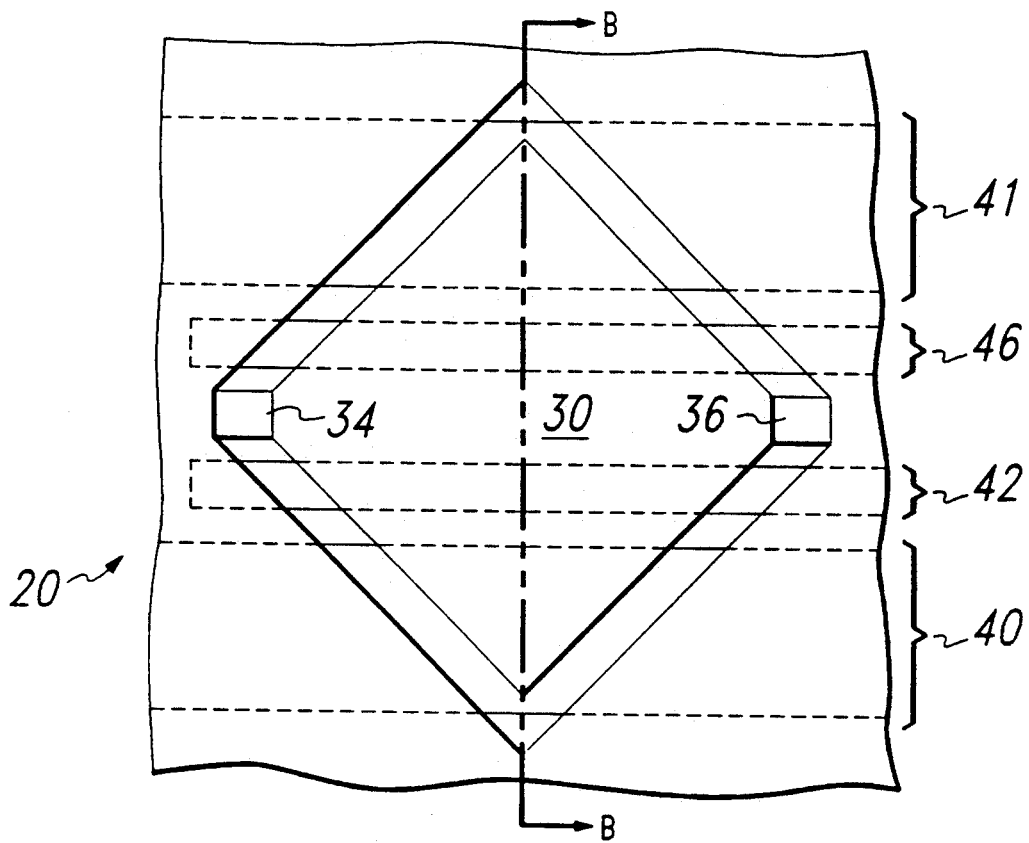

FIGS. 1a-c illustrate in perspective, cross sectional elevation, and plan views a functional rendering of a preferred embodiment mirror. As illustrated by these figures, pixel 20 is operated by applying a voltage between beam 30 and electrodes 42 or 46 on substrate 22. Beam 30 and the electrodes form the two plates of an air gap capacitor and the opposite charges induced on the two plates by the applied voltage exert electrostatic force attracting beam 30 to substrate 22, whereas electrodes 40 and 41 are held at the same voltage as beam 30. The electrostatic force between electrodes 42,46 and beam 30 causes beam 30 to twist at hinges 34 and 36 and be deflected towards substrate 22.

Figure 2:
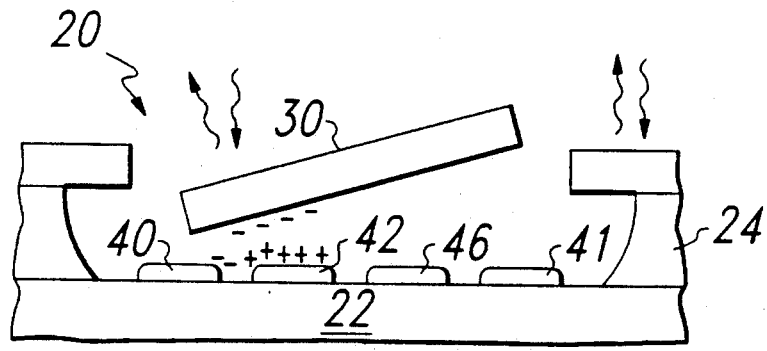
FIG. 2 illustrates deflection of a mirror of the preferred embodiment.

FIG. 2 is a schematic view of the deflection of beam 30 with an indication of the charges concentrated at the regions of smallest gap for a positive voltage applied to electrode 42. For voltages in the range of 20 to 30 volts, the deflection is in the range of 2 degrees. Of course, if hinge 34 were made longer or thinner or narrower, the deflection would increase as the compliance of hinge 34 varies linearly with the inverse of its width and directly with the square of its length and inversely with the cube of its thickness. For a DMD operating in its bistable mode, the beam design is such that the beam's 30 deflection is defined by the landing angles, $\pm\theta_L$, at which point the beam 30 contacts the DMD substrate on landing electrodes 40,41. Note that the thickness of beam 30 prevents significant warping of beam 30 due to surface stress generated during processing, but that the thinness of hinge 34 allows for large compliance. FIG. 2 also indicates the reflection of light from deflected beam 30 as may occur during operation of the DMD.

Figure 3A:
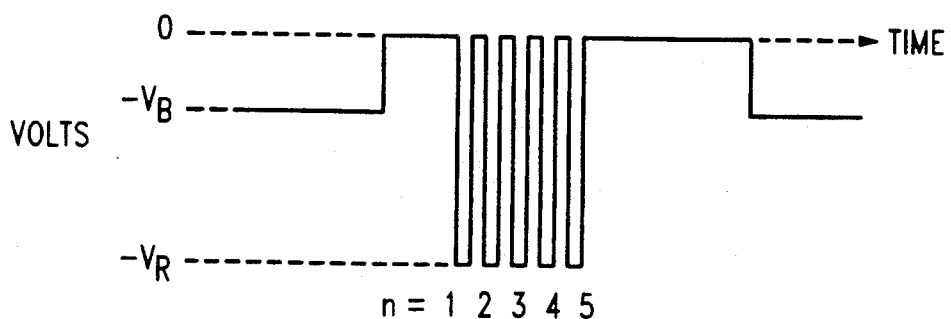
FIGS. 3a-c illustrate a prior art method of a high voltage, high frequency, resonant reset for a prior art DMD.
Figure 3B:
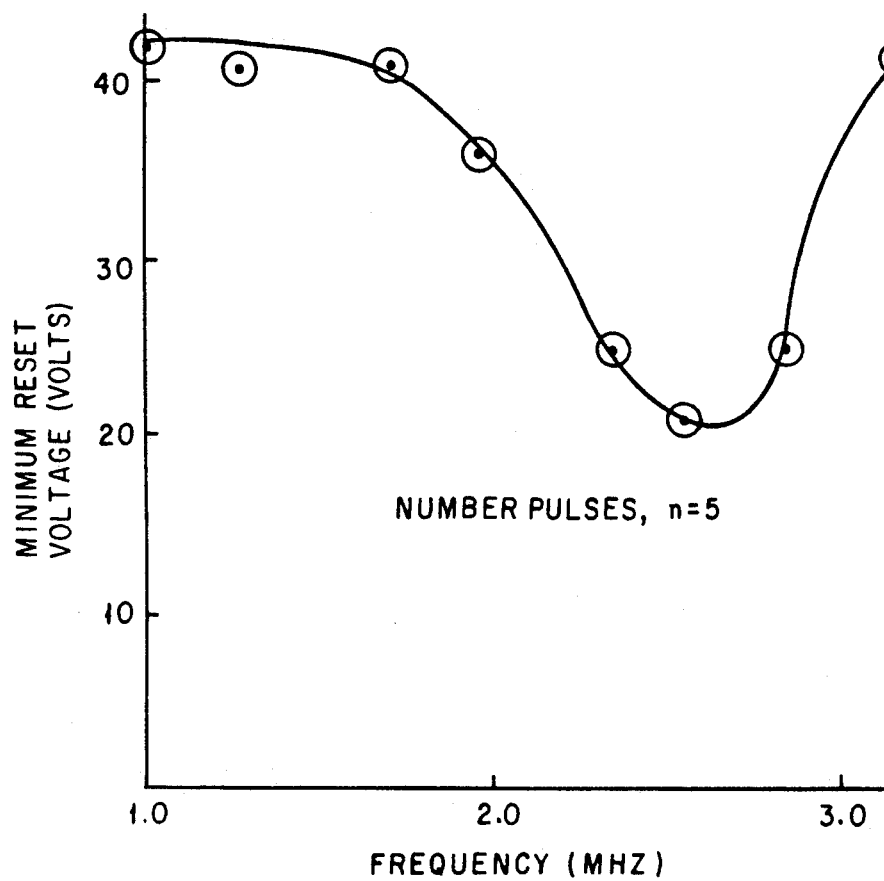
Figure 3C:
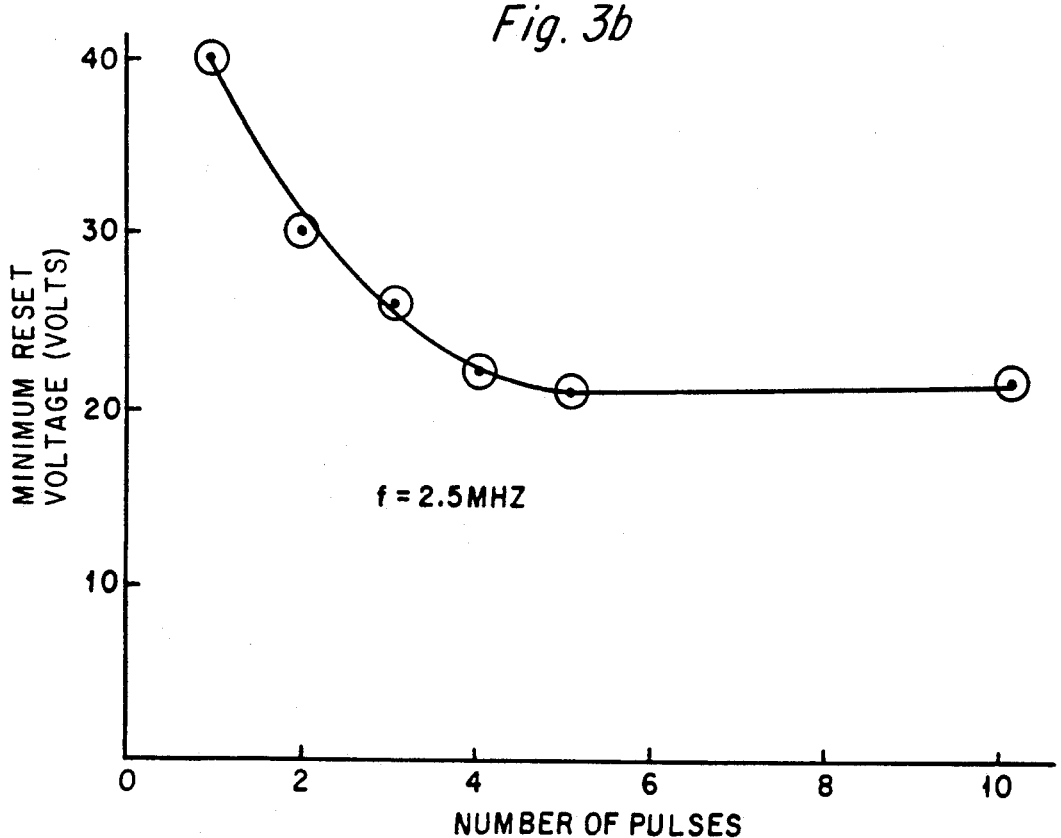

FIGS. 3a-c illustrate a prior art reset method which uses a pulse train of five reset pulses. A typical waveform of this prior art method is illustrated in FIG. 3a. The use of a pulse train in this prior art method allowed the frequency of the pulse train to be adjusted. In particular, if the pulse train frequency is near the resonant frequency for the torsion hinge flexure (nonrotational bending), then maximum energy is transferred into the flexure mode, and a smaller reset voltage may be used. FIG. 3b illustrates the minimum voltage needed for reset as a function of frequency for the prior art pulse train reset applied to a particular DMD having a linear array of 840 pixels with each pixel similar to the first preferred embodiment. FIG. 3c illustrates the effect of the number of pulses in the reset pulse train when the frequency of the pulses is at a resonant frequency. The minimum reset voltage decreases as the number of pulses is increased to five, and beyond five pulses no further decrease is observed. Apparently, with more than five pulses the kinetic energy is large enough that the energy losses due to air damping just balances the energy gained for each additional pulse. Note that while this prior art reset method reduced the minimum reset voltage to approximately 20 V, difficulties exist in constructing circuitry to generate a high voltage, high frequency resonant reset pulse train.

Figure 4:
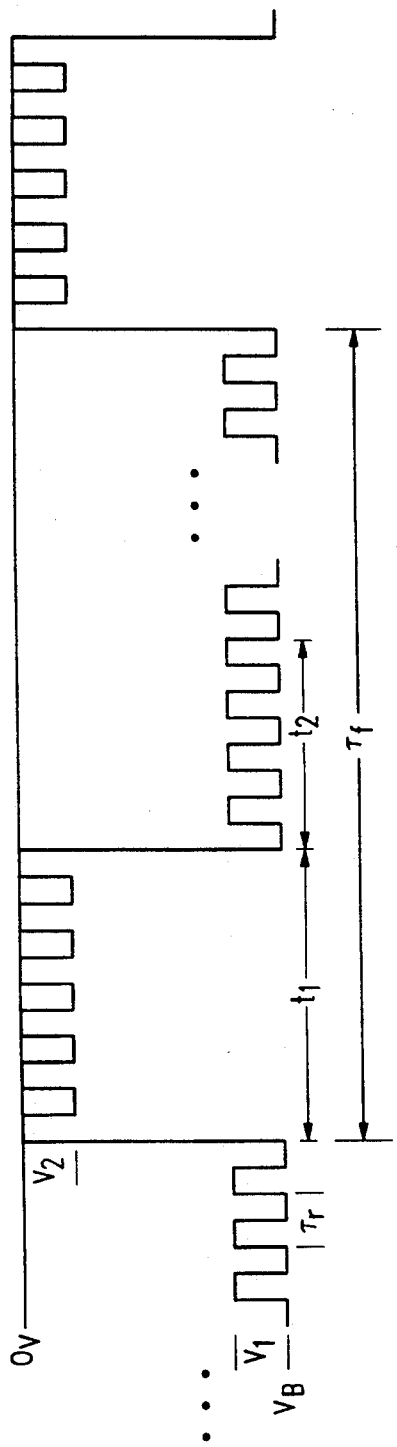
FIG. 4 illustrates a bias method for the mirror of the preferred embodiment which eliminates the need for a high voltage, high frequency, resonant reset.

FIG. 4 illustrates the biasing method of the present invention which obviates the reset pulses and circuitry of prior art devices. U.S. Pat. No. 5,096,279, incorporated by reference herein, discloses the addressing and biasing scheme of a typical bistable DMD in great detail. To summarize, a bistable pixel 20 can be made addressable by establishing a preferred direction for rotation. If both address electrodes 42 and 46 are grounded, then small perturbations will cause beam 30 to randomly rotate and collapse to one of the landing electrodes 40,41 upon application of the differential bias $V_B$ to beam 30 and landing electrodes 40 and 41. However, if prior to application of the differential bias $V_B$, address electrode 46 is set to a potential then a net torque will be produced to rotate beam 30 towards landing electrode 41. Symmetrically, applying the triggering potential to address electrode 42 will rotate beam 30 to landing electrode 40 upon application of the differential bias $V_B$.

Referring still to FIG. 4, the preferred embodiment of the present invention superimposes an AC signal onto the normal DC bias signal, $V_B$, described above. This AC signal has a small amplitude, $V_1$, which may be varied for optimal performance. Of course, other signal shapes (such as sine wave or triangular) may be used. As long as $V_B$ is maintained, beam 30 remains in a stable state regardless of the state of the address electrodes (as long as the voltage applied to address electrodes 42,46 is insufficient to overcome the potential well in which the beam is held by the bias voltage $V_B$). In this manner it is possible to tilt the beam or micromirror 30 to its full deflection ($\pm\theta_L$) without having prolonged, uninterrupted contact with the underlying DMD substrate. By defining the AC signal to have a relatively small amplitude, $V_1$, the optical performance of the micromirror 30 is unaffected, as the small superimposed micromirror 30 deflections are insignificant with respect to the addressed deflection to the mirror landing angle ($\pm\theta_L$). Still, the AC signal may be defined to have a large enough amplitude, $V_1$, to periodically interrupt contact between the mirror and the DMD substrate, preventing formation of chemical bonds and condensation of moisture which can cause the sticking between the micromirror 30 and the DMD substrate. The period of this AC signal, $\tau_r$, is preferably the inverse of the resonant frequency for the torsion hinge flexure (nonrotational bending) which in the preferred embodiment is about 0.2 µs. Upon completion of a video frame period, $\tau_f$, the bias voltage $V_B$ is removed from the beam 30 and the beam 30 is set to zero potential initiating a mirror unlatching time period, $t_1$. During this period, $t_1$, the beams 30 assume neutral positions. Optionally, an AC signal may still be applied during unlatching time period, $t_1$, to act as a low voltage reset pulse train. Again, the amplitude, $V_2$, and period of this AC signal may be adjusted for best operation. Preferably the period of this signal is $\tau_r$. After a sufficiently long period, approximately 12 to 15 µs in a preferred embodiment, the bias voltage $V_B$ is reapplied to the beam 30 and landing electrodes 40,41. For a mirror latching time period, $t_2$, the mirrors assume their new positions. After latching time period, $t_2$, which is typically approximately 12 to 15 µs, the mirrors have settled into their newly addressed positions and new data may be addressed upon the DMD. During mirror latching time period, $t_2$, the AC signal may or may not be applied (if mirror latching time period is reasonably short). During the remainder of video frame period, $\tau_f$, the pixels 20 are held in their stable states as established during the previous video frame, while new data is updated and placed on address electrodes 42,46.

Additional advantages of minimizing or eliminating the reset voltage include a minimizing of the possibility of dielectric failure on the DMD chip and a reduction in power supply complexity. As previously mentioned, the elimination of the high voltage, high frequency resonant reset circuitry and associated switching devices represents a considerable system simplification and cost reduction without degradation in performance. Indeed performance should be slightly improved, as the time taken for application of the reset sequence would be eliminated and can be applied to displaying data.

Figure 5A:
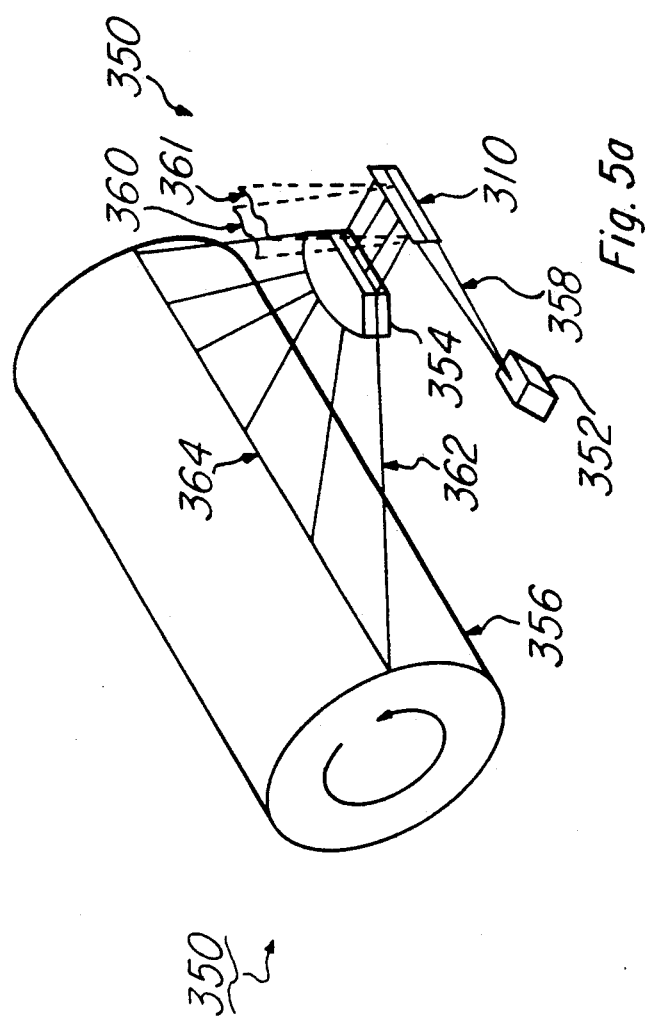
FIGS. 5a-c schematically illustrate use of the preferred embodiment DMD for electrophotographic printing.
Figure 5B:
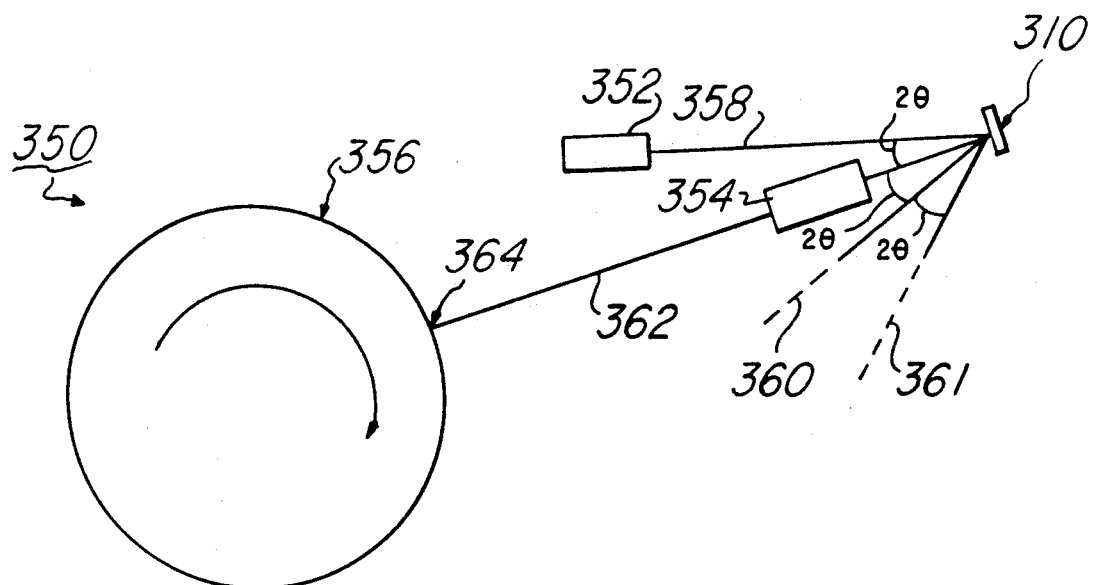
Figure 5C:
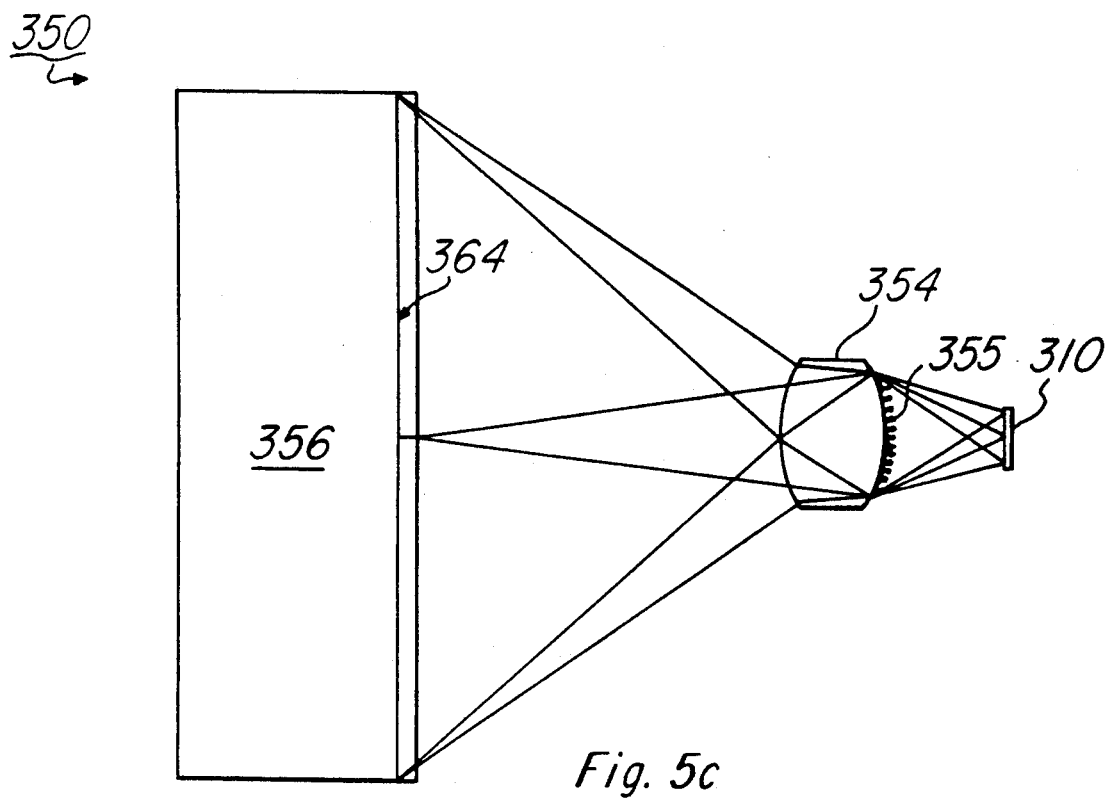

A linear array 310 of preferred embodiment pixels 20 could be used for electrophotographic printing as illustrated schematically in FIGS. 5a–c. FIG. 5a is a perspective view and FIGS. 5b–c are elevation and plan views showing system 350 which includes light source and optics 352, array 310, imaging lens 354 and photoconductive drum 356. The light from source 352 is in the form of a sheet 358 and illuminates linear array 310. Light from the areas between pixels 20 forms sheet 360 which is the specularly reflected sheet of light. The light reflected from negatively deflected beams form sheet 361. The light reflected from positively deflected beams 30 pass through imaging lens 354 within sheet 362 and focus on drum 356 within line 364 as a series of dots, one for each deflected beam 30. Thus a page of text or a frame of graphics information which has been digitized and is in raster-scanned format can be printed by feeding the information a line at a time to array 310 to form dots a line 364 at a time on drum 356 as drum 356 rotates. These dot images are transferred to paper by standard techniques such as xerography. If 0 is the deflection angle of beam 30 when on landing electrodes 41, then sheet 362 is normal to linear array 310 when the angle of incidence of sheet 358 is 20° from the normal to linear array 310. This geometry is illustrated in FIG. 5b and permits imaging lens 354 to be oriented normal to linear array 310. Each positively deflected beam produces an image 355 of light source 352 on imaging lens 354 as schematically shown in FIG. 5c for three beams.

Figure 6A:
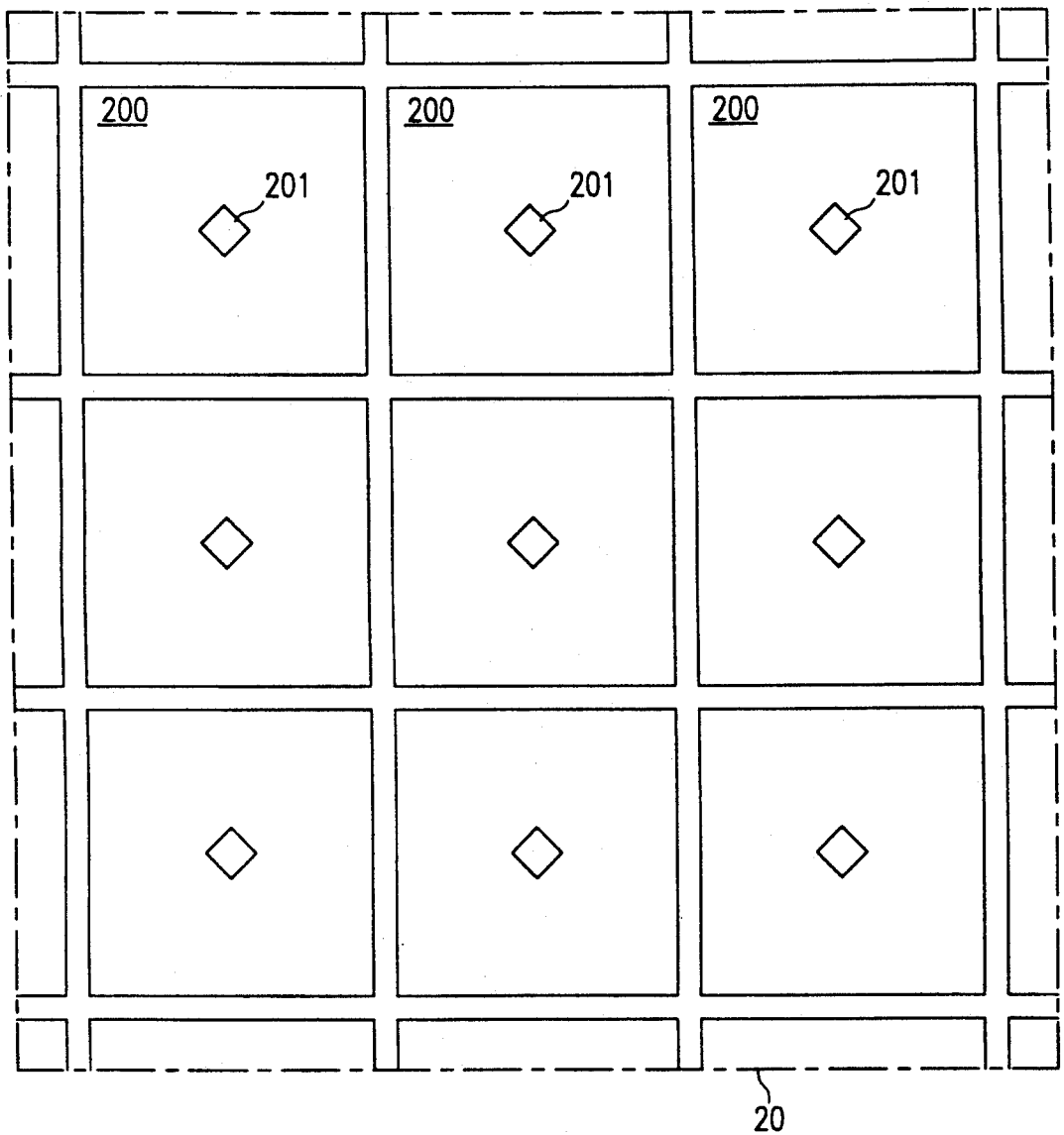
FIG. 6a illustrates a top view of a partial array of preferred embodiment mirrors.
Figure 6B:
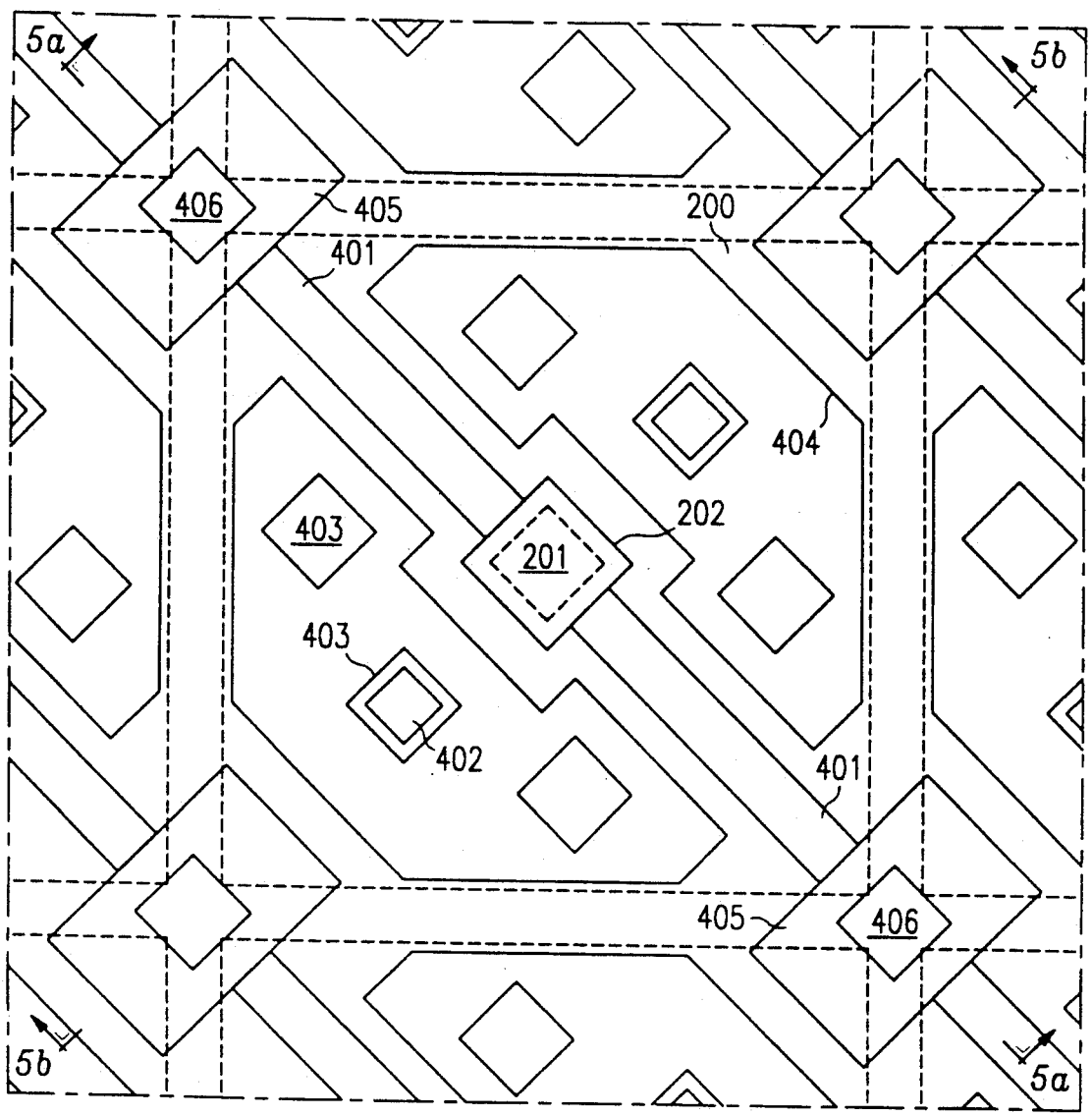
FIG. 6b illustrates a top view of a preferred embodiment mirror showing major hidden features.
Figure 6C:
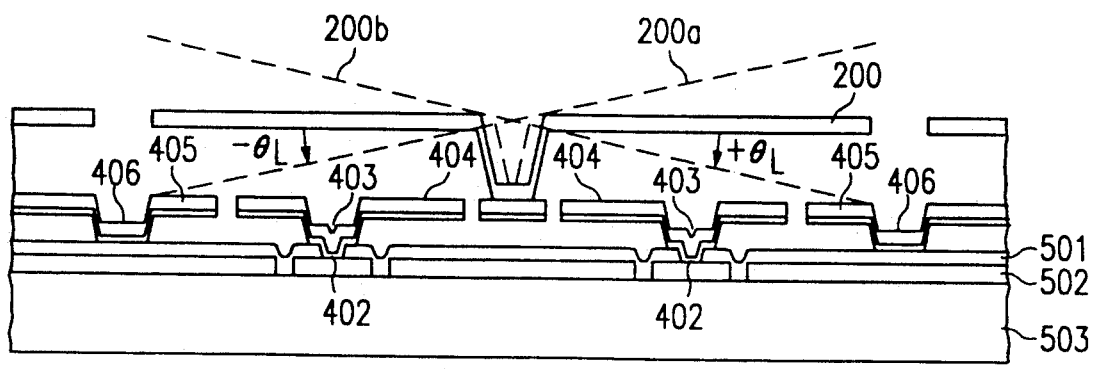
FIG. 6c illustrates a detailed cross sectional view as indicated in FIG. 6b of a preferred embodiment mirror.

FIGS. 6a–c illustrate a top view, a top view showing major hidden features, and a detailed cross section of a partial array of preferred embodiment mirrors. This preferred embodiment structure uses a multi-level deformable mirror structure and method of manufacturing as disclosed by Hornbeck in U.S. Pat. No. 5,083,857. As shown in FIG. 6a, this structure provides a greatly improved area of rotatable reflective surface for a given pixel size. The underlying hinges, address and landing electrodes are shown as dotted lines in FIG. 6b. Beam support post 201 rigidly connects beam 200 to underlying torsion hinge 401. Details of the underlying hinge and electrodes are shown in FIG. 6b. Beam support post 201 allows beam 200 to rotate under control of hinges 401 which in turn are connected to posts 406. This allows rotatable surface (beam) 200 to rotate under control of an electrode supported by posts 403. Beam 200 lands in contact with landing electrode 405. Contact 402 extends through the substrate and is in contact with the underlying address electronics. The construction and operation of this device will be discussed hereinafter. FIG. 6c illustrates beam 200 rotation 200a to landing angle $-\theta_L$ and rotation 200b to landing angle $+\theta_L$. Also shown are address electrodes 404 which control the movement (200a, 200b) and landing electrodes 405 positioned at the other end of the see-saw swing of beam 200. The manner of controlling the rotational movement of beam 200 is detailed in U.S. Pat. No. 5,096,279 filed on Nov. 26, 1990.

Figure 7A:
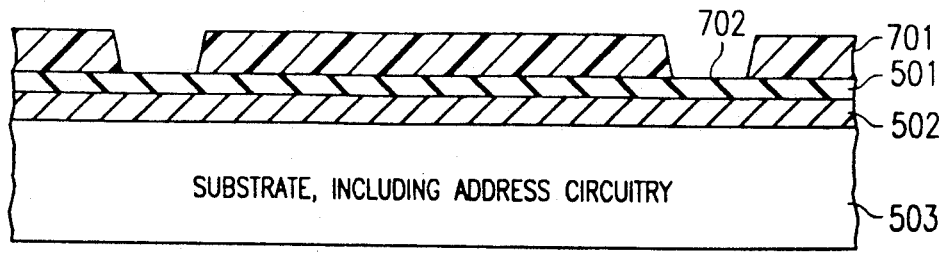
FIGS. 7a-d illustrate, in partial cross section, progressive formation of a mirror of the preferred embodiment.

The process sequence for the hidden hinge architecture is shown in FIGS. 7a–7d and consists of five layers (hinge spacer, hinge, electrode, beam spacer, and beam). Referring now specifically to FIG. 7a, the process begins with a completed address circuit 503 including contact openings formed in protective oxide 501 of the address circuit. The address circuit is typically a two metal layer/poly CMOS process. The contact openings allow access to the second level metal (METL2) 502 bond pads and to the METL2 address circuit output nodes.

Still referring to FIG. 7a, hinge spacer 701 is spin-deposited over the address circuit and patterned with holes 702 that will form the hinge support posts and electrode support posts and contacts. This spacer is typically 0.5 µm thick and is a positive photoresistant deep UV hardened to a temperature of 200° C. to prevent flow and bubbling during subsequent processing steps.

Figure 7B:
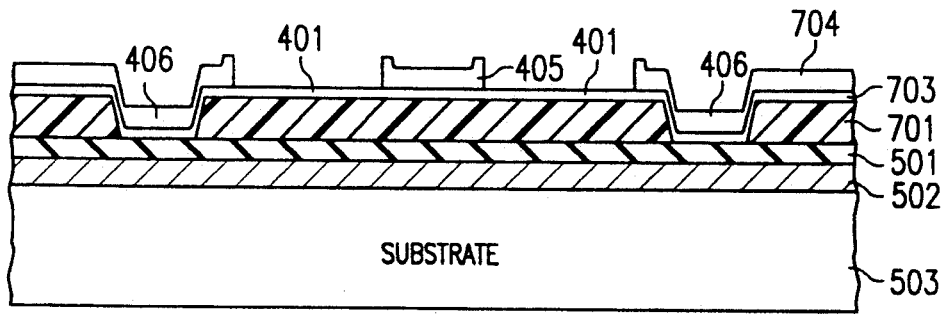

As shown in FIG. 7b, the next two layers 703 and 704 are formed by the so-called buried hinge process. An aluminum alloy that forms the hinge is sputter-deposited onto the hinge spacer. This alloy is typically 750 Å thick and consists of 0.2% Ti, 1% Si and the remainder Al. A masking oxide is plasma-deposited and patterned in the shape of hinges 401. This hinge oxide is then buried by a second aluminum alloy layer 704 that is to form the electrode (typically 3000 Å thick).

With further reference to FIG. 7b, a masking oxide is plasma-deposited and patterned in the shape of the electrodes 404, the electrode support posts 406 and the beam contact metal 405. Next, a single plasma aluminum etch is used to pattern the hinges, electrodes, support posts and beam contact metal. The electrode metal overlying the hinge region is etched away, exposing the buried-hinge oxide which acts as an etch stop. When the plasma aluminum etch is complete, regions of thin hinge metal 703 and thick electrode metal 704 have been simultaneously patterned. The masking oxide is then removed by a plasma etch.

Figure 7C:
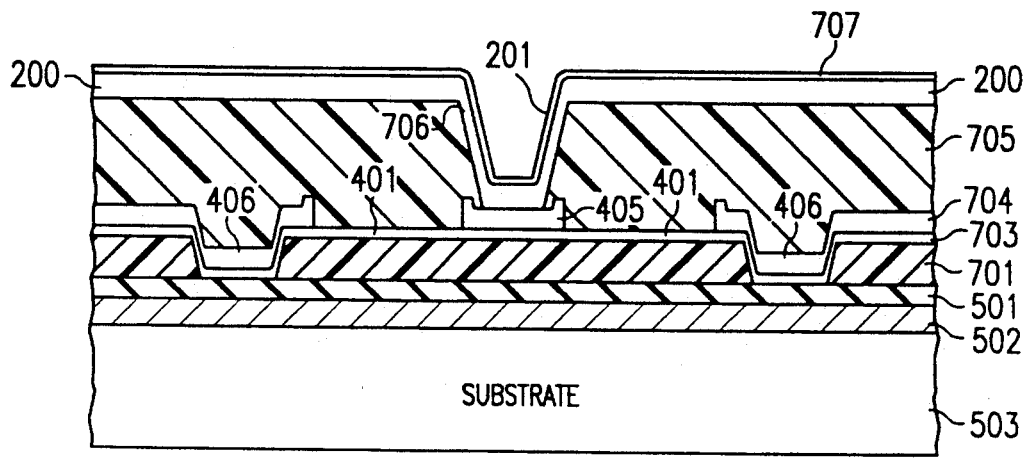
Figure 7D:
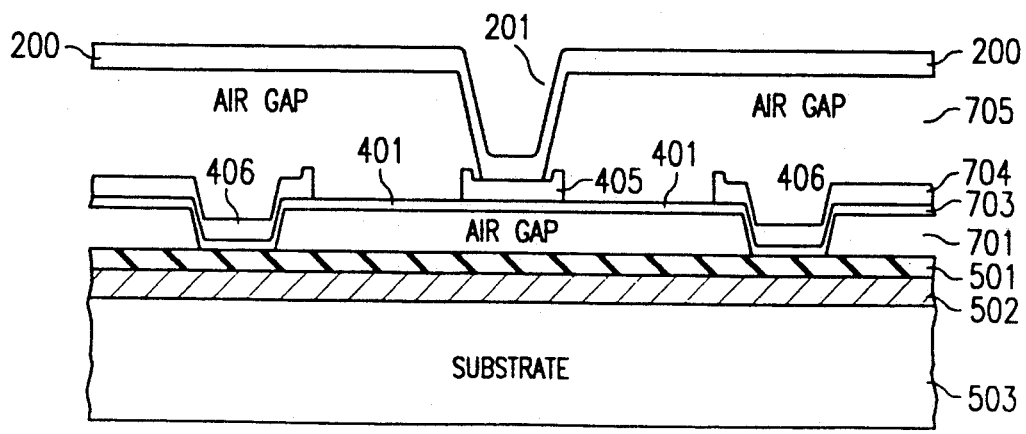

Next as shown in FIG. 7c, beam spacer 705 is spin-deposited over the hinges and electrodes and patterned with holes that will form beam support posts 201. Spacer 705 determines the torsion beam angular deflection and is typically 1.5 microns thick and is a positive photoresistant. It is deep UV hardened to a temperature of 180° C. to prevent flow and bubbling during subsequent processing steps. Note that no degradation of hinge spacer 701 occurs during this bake, because the hinge spacer was hardened to a higher temperature (200° C.). Next, an aluminum alloy that is to form beam 200 (typically 4000 Angstroms thick) is sputter-deposited onto beam spacer 705. Next, masking oxide 707 is plasma-deposited and patterned in the shape of the beams. The beam is then plasma etched to form the beams and beam support posts. This completes the process at the wafer level. Masking oxide 707 on beam 200 is left in place. The wavers are then coated with PMMA, sawed into chip arrays and pulse spin-cleaned with chlorobenzene. Finally, the chips are placed in a plasma etching chamber, where masking oxide 707 is removed and both spacer layers 701 and 705 are completely removed to form the air gaps under the hinges and beams as shown in FIG. 7d.

Although this description describes the invention with reference to the above specified embodiments, the claims and not this description limited the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

A few preferred embodiments have been described in detail hereinabove. It is to be understood that the scope of the invention also comprehends embodiments different from those described, yet within the scope of the claims. Words of inclusion are to be interpreted as non-exhaustive in considering the scope of the invention. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of addressing an array of electromechanical pixels wherein each of said pixels assume one of two or more selected stable states according to a set of selective address voltages, said method comprising the steps of:
   a) electromechanically latching, by applying a bias voltage with an AC and a DC component to said array of pixels, each of said pixels in one of said selected stable states;
   b) applying a new set of selective address voltages to all said pixels in said array;
   c) electromechanically unlatching, by removing said bias voltage from said array, said pixels from their previously addressed state;
   d) allowing said array of pixels to assume a new state in accordance with the new set of selective address voltages; and
   e) electromechanically latching, by reestablishing said bias voltage, each of said pixels.

2. The method of claim 1 wherein said applying step occurs before said electromechanically unlatching step.

3. The method of claim 1 wherein said pixel comprises deflectable beams and said AC component is selected to have the same frequency as the electromechanical resonant frequency of said beams.

4. The method of claim 3 wherein said AC and DC components are adjusted such that said beams are in periodic contact with an underlying substrate.

5. The method of claim 1 wherein said allowing step is approximately 10 to 20 μs in duration.

6. The method of claim 1 wherein said DC component is approximately 16 volts.

7. The method of claim 6 wherein said DC component has a negative polarity.

8. The method of claim 1 wherein said AC component is approximately 5 volts.

9. The method of claim 1 wherein said electromechanical latching step is approximately 10 to 20 μs in duration.

10. A method of addressing a digital micromirror device (DMD) having an array of electromechanical pixels comprising deflectable beams wherein each of said pixels assume one of two or more selected stable states according to a set of selective address voltages, said method comprising the steps of:
   a) electromechanically latching, by applying a bias voltage with an AC and a DC component to said array of pixels, each of said pixels in one of said selected stable states;
   b) applying a new set of selective address voltages to all said pixels in said array;
   c) electromechanically unlatching, by removing said DC component of said bias voltage, said pixels from their previously addressed state;
   d) allowing said array of pixels to assume a new state in accordance with the new set of selective address voltages; and
   e) electromechanically latching, by reestablishing said DC component of said bias voltage, each of said pixels.

11. The method of claim 10 wherein said applying step occurs before said electromechanically unlatching step.

12. The method of claim 10 wherein said AC and DC components are adjusted such that said beams are in periodic contact with an underlying DMD substrate.

13. The method of claim 10 wherein said AC component is selected to have the same frequency as the electromechanical resonant frequency of said beams.

14. The method of claim 10 wherein said allowing step is approximately 10 to 20 μs in duration.

15. The method of claim 10 wherein said DC component is approximately 16 volts.

16. The method of claim 15 wherein said DC component has a negative polarity.

17. The method of claim 10 wherein said AC component is approximately 5 volts.

18. The method of claim 10 wherein said electromechanical latching step is approximately 10 to 20 μs in duration.

* * * * *